No. 822,221. PATENTED MAY 29, 1906.
J. L. PILLING.
PROPELLING WHEEL FOR TURN TABLES.
APPLICATION FILED AUG. 11, 1905.

WITNESSES   INVENTOR
T. P. Massey   James L. Pilling
C. E. Day   By Parker & Burton Attorneys.

UNITED STATES PATENT OFFICE.

JAMES L. PILLING, OF DETROIT, MICHIGAN.

PROPELLING-WHEEL FOR TURN-TABLES.

No. 822,221.　　　　Specification of Letters Patent.　　Patented May 29, 1906.

Application filed August 11, 1905. Serial No. 273,747.

*To all whom it may concern:*

Be it known that I, JAMES L. PILLING, a citizen of the United States, residing at Detroit, county of Wayne, State of Michigan, have invented certain new and useful Improvements in Propelling-Wheels for Turn-Tables; and I declare the following to be a full, clear, and exact description of the invention, such as will enable others skilled in the art to which it pertains to make and use the same, reference being had to the accompanying drawings, which form a part of this specification.

This invention relates to propelling-wheels for locomotive turn-tables.

It has for its object an improved trailing wheel adapted and intended to be used in connection with a driving mechanism for the propulsion of a turn-table around a track on which it travels.

Figure 1:
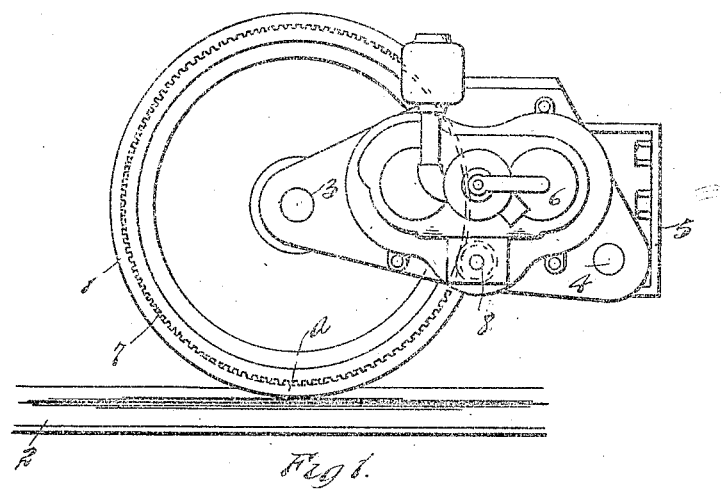
Figures 2, 3:
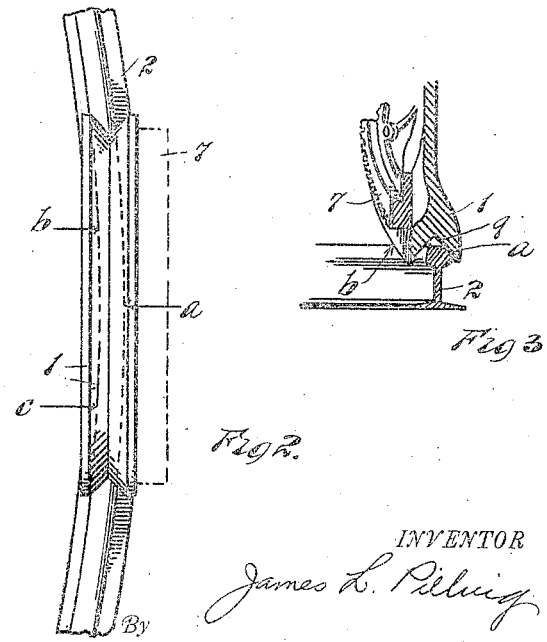

In the drawings, Figure 1 is a side elevation of the trailing wheel and the motor connected with it and the trunnion-plate by which it is connected to the turn-table. Fig. 2 is a plan indicating the engagement between the wheel and the rail. Fig. 3 is a cross-section of the wheel and rail, showing the groove in the wheel-tire.

1 indicates the wheel, and 2 the rail of the turn-table track. The wheel is journaled in bearings 3, which are pivotally connected by pivot 4 to a trunnion-plate 5, by means of which the trailing wheel is bolted or otherwise secured to the turn-table. On the pivoted frame 3 is the motor-engine 6, by means of which the trailing wheel is actuated, and for the purpose of such actuation the trailing wheel is provided with a gear 7, that meshes with a gear on the shaft 8, driven by the engine. The motor may be of any well-known type and be driven by any proper motive fluid.

The tire of the wheel 1 is deeply grooved with a triangular groove 9, that sits over the rail 2 and engages against the sides of the rail. Because of the curvature of the rail in the curved track used with turn-tables the groove engages the rail at three points, (indicated in Fig. 2 at *a*, *b*, and *c*,) and because of the triangular shape of the groove 9 the engagement is one which produces great tractional force.

What I claim is—

In combination a frame having pivoted connections for engagement with a turn-table and pivoted connections with a wheel, a motor on said frame, a wheel provided with a tread having a V-shaped groove therein whereby said wheel is adapted to engage a curved track with a three-point bearing, substantially as described.

In testimony whereof I sign this specification in the presence of two witnesses.

JAMES L. PILLING.

Witnesses:
　CHARLES F. BURTON,
　MAY E. KOTT.